United States Patent
Tang (10) Patent No.: US 9,165,220 B2
(45) Date of Patent: Oct. 20, 2015

(54) IMAGE OBJECT RECOGNITION BASED ON A FEATURE VECTOR WITH CONTEXT INFORMATION

(71) Applicant: HEWLETT-PACKARD DEVELOPMENT COMPANY, L.P., Houston, TX (US)

(72) Inventor: Henry "Hoa" Tang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 13/717,706

(22) Filed: Dec. 18, 2012

(65) Prior Publication Data
US 2014/0169680 A1    Jun. 19, 2014

(51) Int. Cl.
G06K 9/46    (2006.01)
G06K 9/72    (2006.01)

(52) U.S. Cl.
CPC ............... *G06K 9/72* (2013.01); *G06K 9/4642* (2013.01)

(58) Field of Classification Search
None
See application file for complete search history.

(56) References Cited

U.S. PATENT DOCUMENTS

| | | | |
|---|---|---|---|
| 6,307,964 B1 | 10/2001 | Lin et al. | |
| 7,809,722 B2 | 10/2010 | Gokturk et al. | |
| 2007/0183629 A1* | 8/2007 | Porikli et al. | 382/103 |
| 2008/0199055 A1* | 8/2008 | Lee et al. | 382/118 |
| 2010/0074530 A1* | 3/2010 | Magai et al. | 382/195 |
| 2012/0099790 A1* | 4/2012 | Lyuh et al. | 382/170 |
| 2012/0288167 A1* | 11/2012 | Sun et al. | 382/118 |

OTHER PUBLICATIONS

David G. Lowe, Distinctive Image Features from Scale-Invariant Keypoints, International Journal of Computer Vision 60(2), 91-110, 2004, copyright 2004 Kluwer Academic Publishers.*
Gaqlleguillos, C et al, "Multi-Class Object Localization by Combining Local Contextual Interactions", Jun. 13-18, 2010.
Shotton, Jamie et al, "Textonboost for Imaage Understanding: Multi-class object recognition and Segmentation . . . ", Int. J Computer Vision V 81(1), Jan. 2009.
Lowe, D.G., "Object Recognition from Local Scale-invariant Features", Sep. 1999.

* cited by examiner

*Primary Examiner* — Brian P Werner
(74) *Attorney, Agent, or Firm* — Hewlett-Packard Patent Department (57) ABSTRACT

Examples disclosed herein relate to image object recognition based on a feature vector with context information. A processor may create an expanded feature vector related to a first area of an image including context information related to the first area. The processor may determine the presence of an object in the image based on the feature vector and output information about the determined object.

8 Claims, 6 Drawing Sheets

IMAGE OBJECT RECOGNITION BASED ON A FEATURE VECTOR WITH CONTEXT INFORMATION

BACKGROUND

Object recognition may involve determining the presence of an object in an image based on a statistical comparison of the features of the image to features representative of the object. A processor may create feature vectors where each feature vector includes information about the local features of the image in a particular area of the image. The processor may analyze a group of feature vectors to determine the likelihood of a particular type of object appearing in the image.

BRIEF DESCRIPTION OF THE DRAWINGS

The drawings describe example embodiments. The following detailed description references the drawings, wherein.

DETAILED DESCRIPTION

Automatic object recognition may be used to determine the content of images, for example, to organize or edit images. Feature vectors may be vectors that represent information about the local features in a particular area of the image. For example, each of the vector values may represent information about a particular local feature in the area represented by the feature vector. The feature vector, such as a Scale Invariant Feature Transform (SIFT) vector, may assume the independence of the local features and limit itself to the features in the particular area covered by the feature vector. Object recognition methods, such as bag-of-words classifier and support vector machine classifier, may be used to analyze feature vectors of different areas of the image to determine the probability of a particular type of object being present in the image.

In one implementation, a feature vector is expanded to include both information about the features of a particular area of the image represented by the feature vector and information about context related to the features of the particular area of the image. The context information may include, for example, information about features of adjacent areas of the image and/or information about a rate of change of features from the area of the image. The expanded feature vector may then be analyzed using object recognition methods to determine the likelihood of the presence of a particular type of object.

Analyzing feature vectors including context information may improve the accuracy of object recognition methods. Feature vectors that do not include context information may incorrectly assume that local image features are independent. Expanding feature vectors to include context information allows for local low level context information to be taken into account when performing object recognition.

Figure 1:
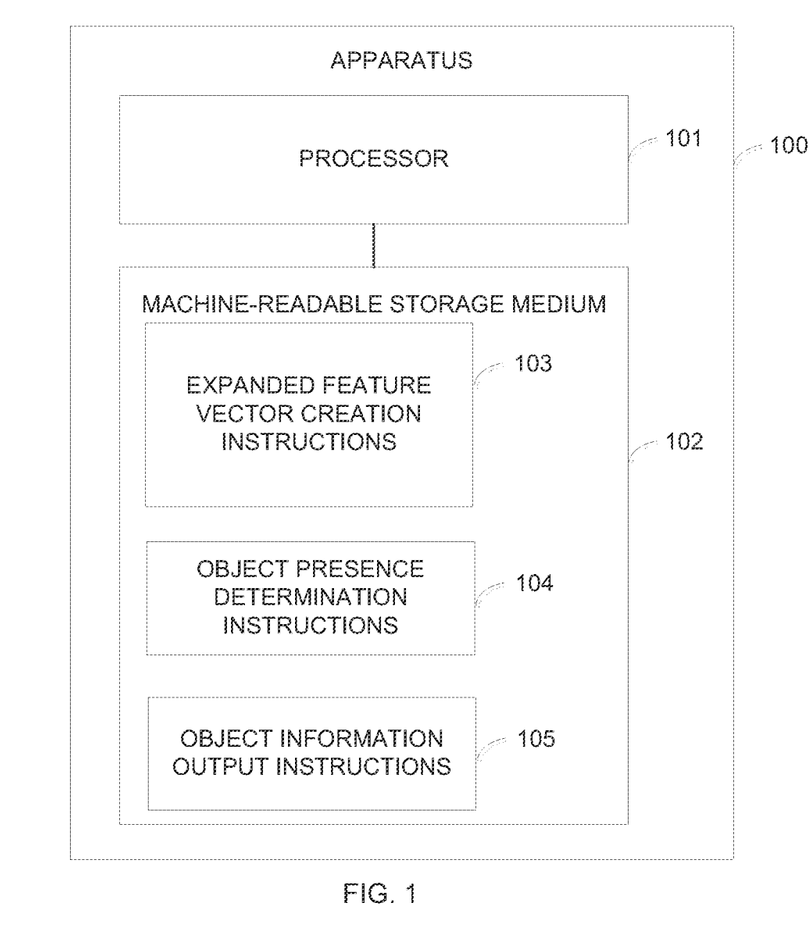
FIG. 1 is a block diagram illustrating one example of an apparatus to recognize an object in an image based on a context expanded feature vector.

FIG. 1 is a block diagram illustrating one example of an apparatus 100 to recognize an object in an image based on a context expanded feature vector. The apparatus 100 may create an expanded feature vector that includes information about the features of the area represented by the feature vector as well as context information related to the area. The context information may be related to local image features that provide context to the image features covered by the feature vector. The apparatus 100 may analyze the feature vector to recognize an object within the image. The apparatus 100 may include a processor 101 and a machine-readable storage medium 102.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include instructions executable by the processor 101. For example, the machine-readable storage medium 102 may include expanded feature vector creation instructions 103, object presence determination instructions 104, and object information output instructions 105.

The expanded feature vector creation instructions 103 may include instructions to create a feature vector that includes information about the area covered by the feature vector in addition to context information related to the area covered by the feature vector. The expanded feature vector may indicate the local features of the particular area as well as the interaction with other areas. The expanded feature vector may be created in any suitable manner. The information may be aggregated or summarized. In one implementation, the expanded vector is created by stacking the feature vector for the area with a context information feature vector.

An image may be divided into sections, such as in a grid pattern, and a feature vector may be associated with each individual section. An expanded feature vector may include information about the section covered by the feature vector as well as context information about the local features nearby the section covered by the feature vector.

The context information may include, for example, information about the local features of areas of the image nearby the particular area. For example, the processor may determine a window around the area and include feature information about grid positions within the window. The feature information for the other grid positions may be determined in the same manner as the feature information for the particular area covered by the feature vector.

In one implementation, the context information includes comparison information related to areas of the image in a window surrounding the area. For example, a derivative of the features of the particular area may be determined and included in the expanded feature vector. The derivative may be any order, and any number of derivatives in any suitable directions may be used. The derivative context information may provide information related to the dynamic features in the area of the image.

The object presence determination instructions 104 may include instructions to analyze the expanded feature vector to recognize an object within the image. Any suitable method may be used. In one implementation, a bag-of-words classifier method is used to recognize an object within the image based on an expanded feature vector. In some cases, the same methods or similar methods to those used to analyze a feature vector may be applied to an expanded feature vector.

Any number of feature vectors related to the image may include context information. For example, the entire set of feature vectors or a subset of the feature vectors may be expanded feature vectors with context information. The processor 101 may analyze any number of the feature vectors related to the image to determine the likelihood of the presence of a particular type of object within the image. As an example, the feature vectors may be analyzed to determine the presence of a human face in the image, and the location of the face may be determined based on the location of the feature vectors indicating a face.

The object information output instructions 105 may include instructions to output information about the object determined to be in the image. Information about the object may be stored, displayed, or transmitted. The information may be any suitable information, such as information about the object and the probability of the object being presence in the image. In some implementations, the machine-readable storage medium 102 may include additional instructions to process the image based on the recognition of a particular type of object within the image. The processor 101 may output additional information about the detected object, such as location or other characteristics.

Figure 2:
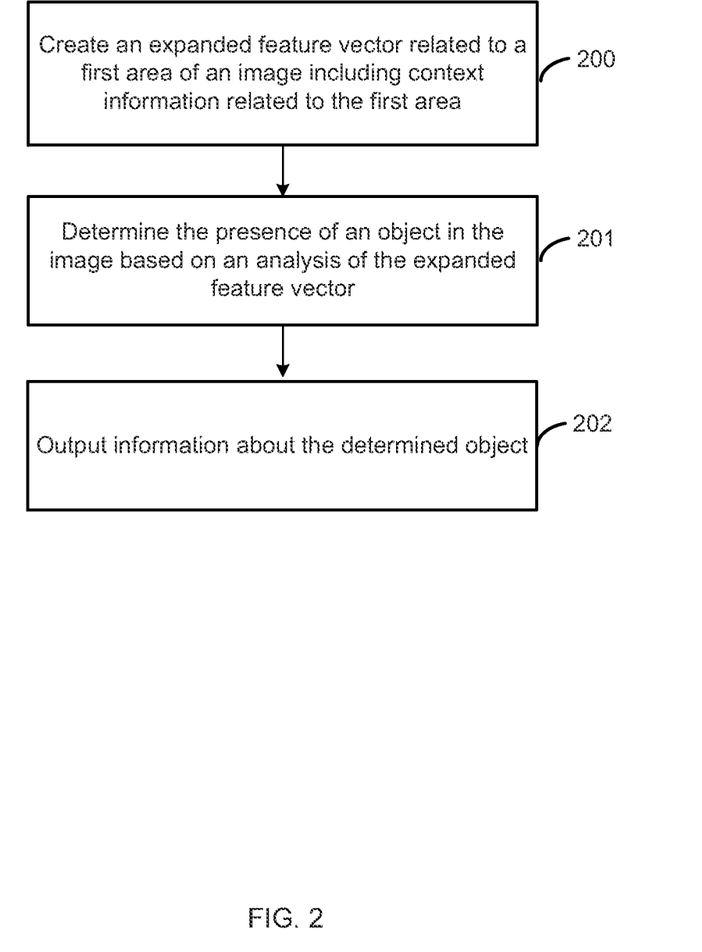
FIG. 2 is a flow chart illustrating one example of a method to recognize an object in an image based on a context expanded feature vector.

FIG. 2 is a flow chart illustrating one example of a method to recognize an object in an image based on a context expanded feature vector. For example, object recognition methods, such as a bag-of-words classifier method may be applied to feature vectors that include values indicating features of the particular area represented by the feature vector. An expanded feature vector may be created where the feature vector includes both values indicating features of the particular area and values providing context information related to the features of the particular area. The context information may indicate information about the local features nearby the particular area of the image. An object recognition method may then be applied to the expanded feature vector such that individual areas and their context within the image are taken into account when determining the probability of a presence of a particular type of object within the image. The method may be implemented, for example, by the processor 101 in FIG. 1.

Beginning at 200, a processor creates an expanded feature vector related to a first area of an image including context information related to the first area. The image may be, for example, retrieved from a storage or received from a remote source via a network. The image may be any image content in any suitable format, such as a JPEG image. The area of the image may be determined in any suitable manner. For example, the image may be divided into a grid pattern, and a feature vector may be created for each grid position to represent the local features of each grid position. Each vector value may represent a different feature of the grid position. The features may be related to, for example, color, texture, edges, or intensity. The features may also be color or intensity gradient based features, such as Scale-invariant Feature Transform (SIFT) or Histogram of Oriented Gradients (HOG).

The context information may be, for example, information related to the area around the area covered by the feature vector. For example, the feature vector may include feature information about the features in grid positions adjacent to or near the grid position of the feature vector. In some cases, the grid positions are not adjacent, such as where more important information for object recognition is not included in an adjacent grid position. In one implementation, the processor includes feature information of eight grid positions adjacent to the grid position. The processor may determine a window centered around the grid position of the feature vector. The window may be, for example, a square or circular window, and the feature vectors of the grid positions included within the window may be included in the expanded feature vector. In one implementation, the processor analyzes the features of the nearby areas to determine which areas information to include within the expanded feature vector.

The feature vector may include the context information by combining the feature information with the context information. In one implementation, the feature includes values representative of the grid position related to the feature vector and additional values are concatenated in the same vector. For example, the data may be stacked in the vector such that the feature vector is stacked with additional feature vectors from nearby locations in the image. In some cases, the information may be combined such that it is aggregated or summarized.

In one implementation, the feature vector includes comparison information of the area covered by the feature vector to nearby areas in the image. The context information may be dynamic feature information describing changes occurring within the image from the originating grid position across the spatial space of the image. The processor may determine a derivative related to the feature vector. For example, the processor may determine a velocity or acceleration of a feature along an x or y axis of the image. Any number and order of derivative may be used and any number of axes may be used. In one implementation, a first order velocity derivative is obtained by taking the finite difference derivatives of the features of the feature vector over the x and y directions using a finite length window centered at the grid position associated with the feature vector, and a second order acceleration derivative is obtained by taking the finite difference derivatives of the velocity features over the x and y directions using a finite length window centered at the grid position associated with the feature vector. The finite length window for the directive may be any size and position.

As an example, the velocity along the x direction in the grid position i,j may be determined as the following where k is a position indicator:

$$\Delta f^{(x)}_{i,j} = \Sigma^k_{k=1} k(f_{i+k,j} - f_{i-k,j})/2\Sigma^k_{k=1} k^2$$

The velocity along the y direction in the grid position i,j may be determined as the following where k is a position indicator:

$$\Delta f^{(y)}_{i,j} = \Sigma^k_{k=1} k(f_{i,j+k} - f_{i,j-k})/2\Sigma^k_{k=1} k^2$$

The acceleration along the x direction in the grid position i,j may be determined as the following where k is a position indicator:

$$\Delta\Delta f^{(x)}_{i,j} = \Sigma^k_{k=1} k(\Delta f_{i+k,j} - \Delta f_{i-k,j})/2\Sigma^k_{k=1} k^2$$

The acceleration along the y direction in the grid position i,j may be determined as the following where k is a position indicator:

$$\Delta\Delta f^{(y)}_{i,j} = \Sigma^k_{k=1} k(\Delta f_{i,j+k} - \Delta f_{i,j-k})/2\Sigma^k_{k=1} k^2$$

A feature vector may be created that includes original, velocity, and acceleration features. In one implementation, the features are stacked in the vector as if the vectors are combined. In one implementation, the features are aggregated and at least some vector positions include summary information.

Continuing to 201, a processor determines the presence of an object in the image based on an analysis of the expanded feature vector. Any number of feature vectors may be used to determine the presence of an object in the image. For example, feature vectors from each grid position in an image or a subset of grid positions may be analyzed. Any number of vectors used in the method may include context information. For example, the entire set of vectors or a subset of the vectors may include context information. In some implementations, vectors in particular positions or with particular features are expanded to include context information. Any suitable method for determining the likelihood of the presence of an object within an image based on a feature vector may be used. For example, spatial pyramid matching (SPM), Gaussian mixture model (GMM), locality constrained coding (LCC), and fisher vector (FV) may be used.

Moving to 202, a processor, such as the processor 101 from FIG. 1, outputs information about the determined object. The processor may display, store, or transmit the information about the determined object. For example, the information may be displayed to a user. The information may be used to determine additional processing within the image. For example, if a human face is detected, additional processing may match the face to stored images. In one implementation, the processor determines a likelihood of the presence of different objects and outputs the objects with the highest likelihood along with the probabilities. The processor may also output information about the location of the object within the image.

Figure 3:
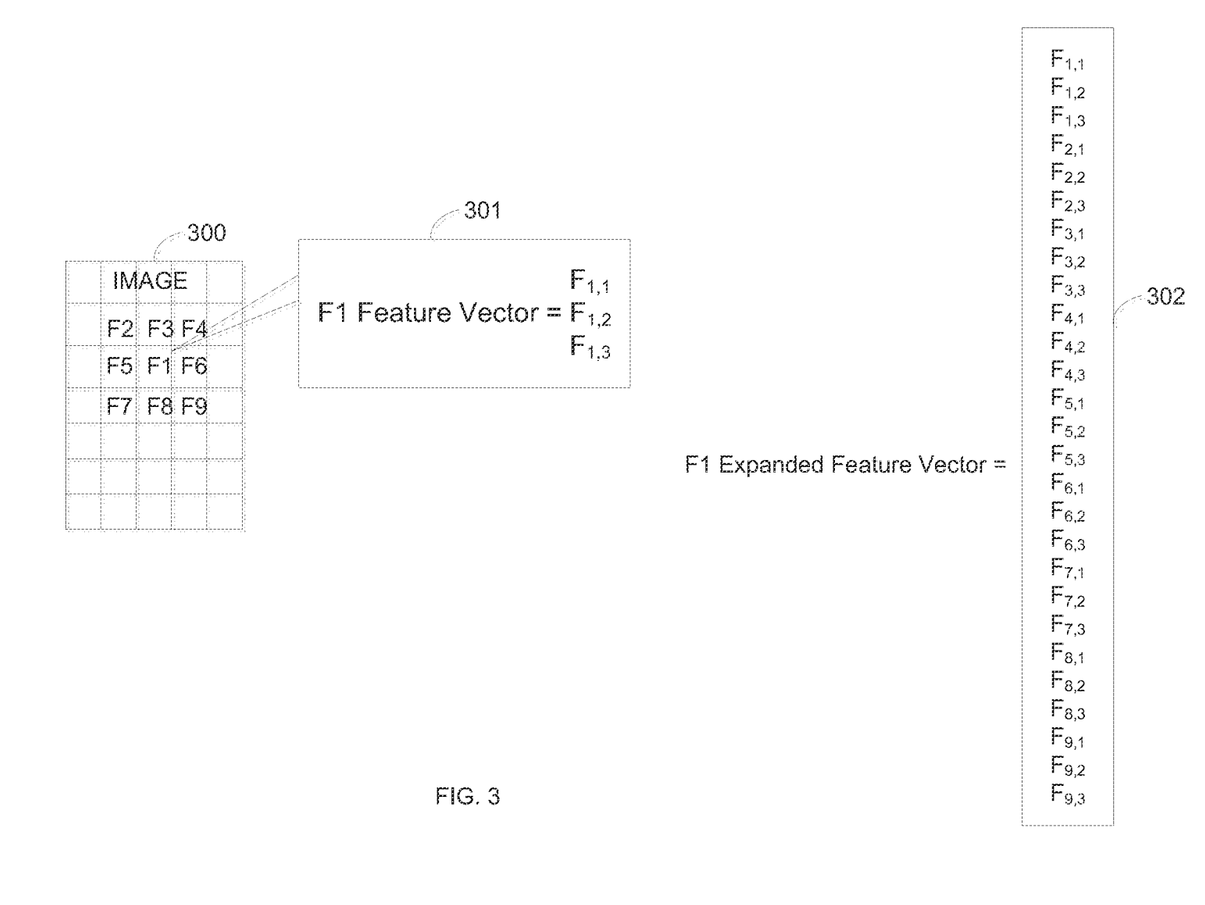
FIG. 3 is a diagram illustrating one example of recognizing an object in an image based on a feature vector expanded with context information from adjacent areas of the image.

FIG. 3 is a diagram illustrating one example of recognizing an object in an image based on a feature vector expanded with context information from adjacent areas of the image. Image 300 shows an image divided into sections. Each section may be represented by a feature vector, F1, F2, F3, F4, F5, F6, F7, F8, and F9. The sections may be any suitable size, such as a single pixel or a group of pixels. The individual feature vectors may include any suitable dimensions and number of items, As an example, each feature vector of image 300 has three vector positions, as shown in block 301 by the F1 feature vector including vector items $F_{1,1}$, $F_{1,2}$, and $F_{1,3}$ such that the first subscript represents the feature vector and the second subscript represents the position in the particular feature vector, Each value in the vector may indicate a characteristic of the area of the image covered by the F1 feature vector. The other feature vectors may each include three positions. In some cases, the different feature vectors may contain different numbers of values.

A processor may create an expanded feature vector that includes information from the feature vector of the particular area represented by the feature vector (F1) as well as information about surrounding areas (other grid positions surrounding F1). As an example, a feature vector for a position may include the feature vector for that position concatenated with feature vectors of image positions adjacent to the position. Block 302 shows a context information expanded feature vector for F1. The expanded feature vector 302 includes the three positions from F1 as well as the feature vectors of the surrounding areas represented by F2, F3, F4, F5, F6, F7, F8, and F9. For example, the expanded feature vector F1 includes the three vector positions for each of the eight grid positions adjacent to the position for F1. Other implementations are also possible, such as using a grid position near F1 that is not adjacent to it or using fewer than the eight grid positions. The expanded feature vector F1 may then be analyzed using object recognition feature vector analysis methods.

Figure 4:
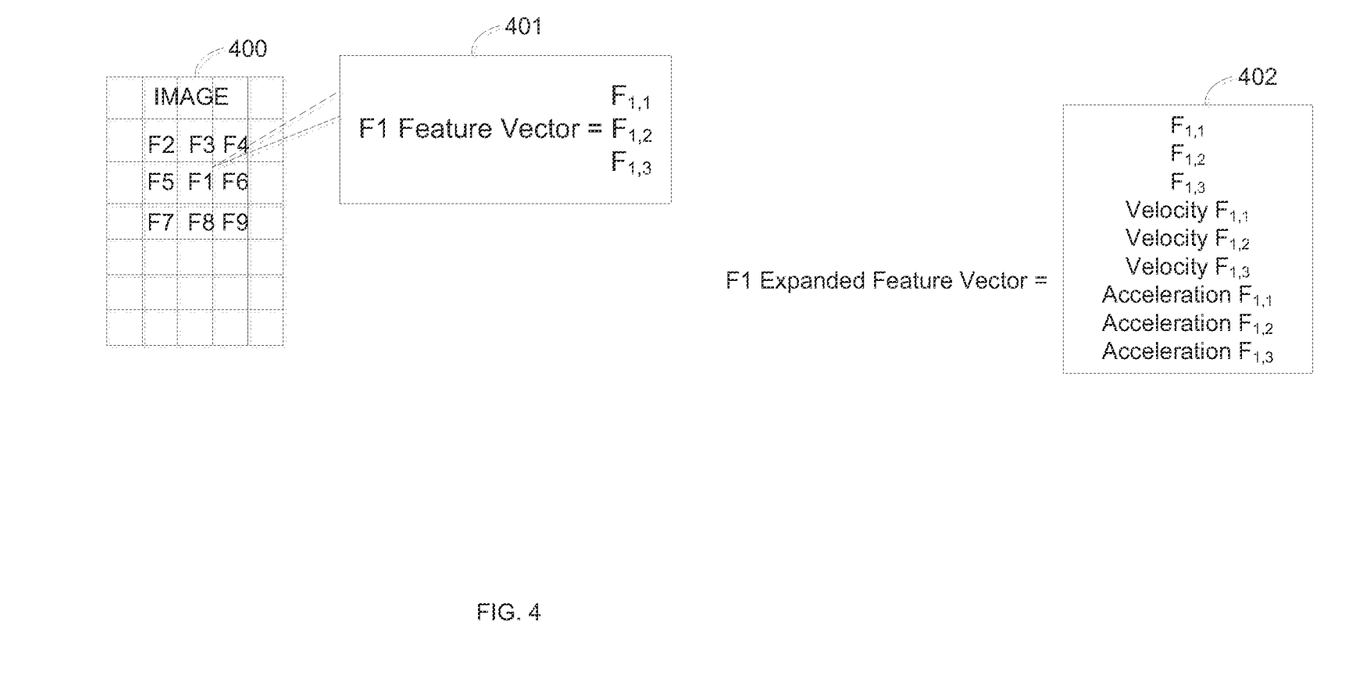
FIG. 4 is a diagram illustrating one example of recognizing an object in an image based on a feature vector expanded with context derivative information.

FIG. 4 is a diagram illustrating one example of recognizing an object in an image based on a feature vector expanded with context derivative information. Image 400 shows an image divided into sections. For example, a grid maybe overlaid over the image, and each grid section may be represented by a feature vector. In image 400, the grid sections are each represented by one of the feature vectors F1, F2, F3, F4, F5, F6, F7, F8, and F9. The sections may be any suitable size, such as a single pixel or a group of pixels. The feature vectors representing each section may be any suitable dimensions and number of items. As an example, each feature vector of image 400 has three vector positions, as shown in block 401 by the F1 feature vector including vector items $F_{1,1}$, $F_{1,2}$, and $F_{1,3}$ such that the first subscript represents the feature vector and the second subscript represents the position in the particular feature vector. The other feature vectors may each include three positions.

The F1 expanded feature vector 402 includes the three positions from the F1 feature vector as well as velocity and acceleration information related to each of the three positions. For example, there are three velocity values and three acceleration values, one related to each of the three features represented in the feature vector F1. The velocity and acceleration may describe the change in the feature in the space of the image originating at F1 within a window surrounding F1. The derivative information may be used to show change between the features at F1 across the image. The derivative information may include any number and order of derivatives. For example, a feature vector may include the original features and velocity or the original features and acceleration features. The derivative information may include multiple directions, such as X and Y direction velocity.

Figure 5:
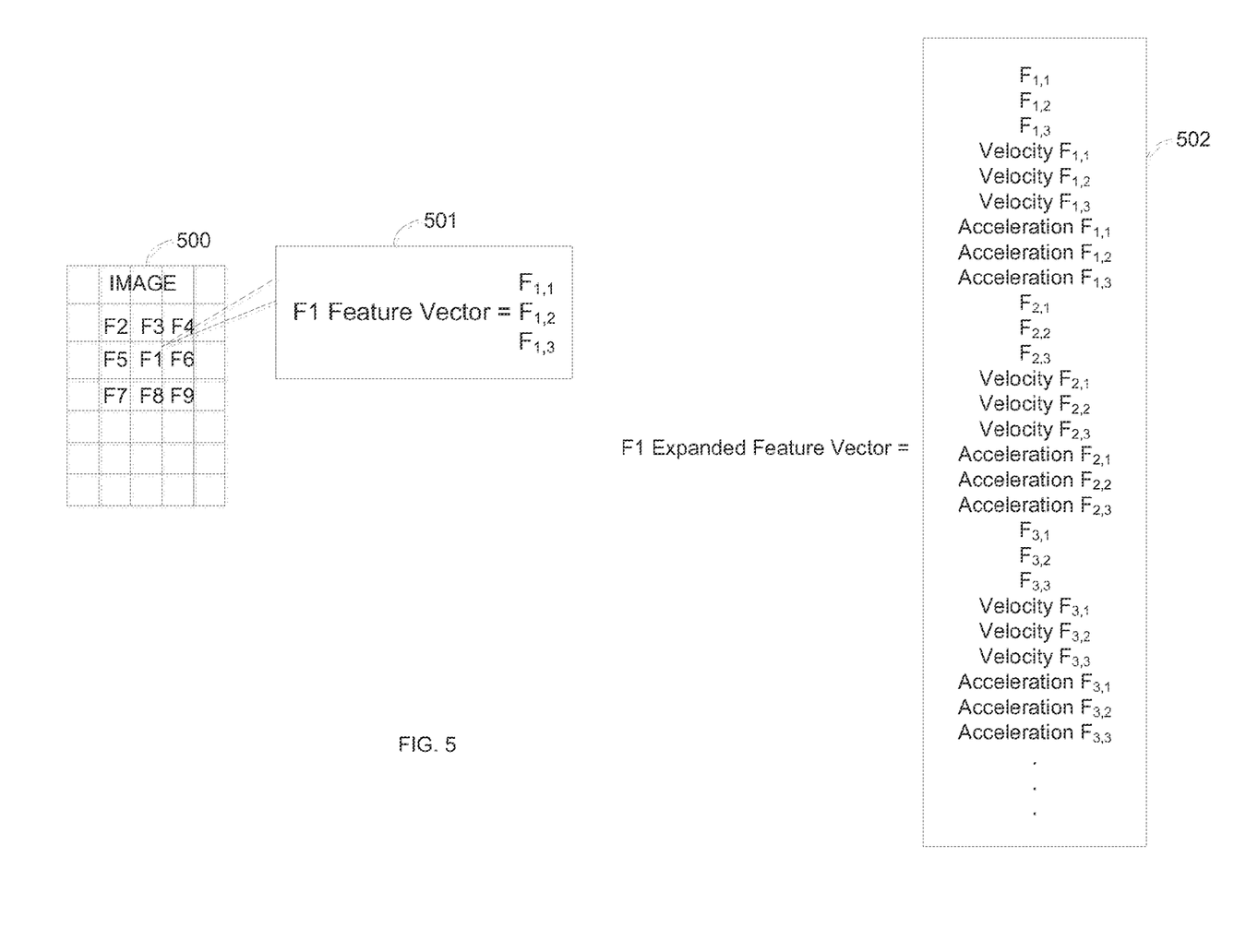
FIG. 5 is a diagram illustrating one example of recognizing an object in an image based on a feature vector expanded with context derivative information and adjacent area information.

FIG. 5 is a diagram illustrating one example of recognizing an object in an image based on a feature vector expanded with context derivative information and adjacent area information. For example, the types of expanded feature vector from FIGS. 3 and 4 may be combined.

Image 500 shows an image divided into sections with each section represented by a feature vector, F1, F2, F3, F4, F5, F6, F7, F8, and F9. The individual feature vectors may include any suitable dimensions and number of items. As an example, each feature vector of image 500 has three vector positions, as shown in block 501 by the F1 feature vector including vector items $F_{1,1}$, $F_{1,2}$, and $F_{1,3}$ such that the first subscript represents the feature vector and the second subscript represents the position in the particular feature vector. The other feature vectors may each include three positions.

The context information expanded feature vector 502 includes feature vectors from areas of the grid adjacent to F1 and includes derivative information related to both F1 and the adjacent grid position feature vectors. For example, the expanded feature vector 502 includes the feature vectors for F1, F2, F3, F4, F5, F6, F7, F8, and F9, and the velocity feature vectors of F1, F2, F3, F4, F5, F6, F7, F8, and F9, and the acceleration vector of F1, F2, F3, F4, F5, F6, F7, F8, and F9. Other combinations are also possible, such as different grid positions of the selected feature vectors and a different number and/or orders of derivatives. In some cases, the number and order of derivatives may vary by feature location, such as where derivative information is included related to some feature vectors but not related to other feature vectors. The context information expanded feature vector 502 includes additional information that may allow for better object recognition. For example, the absolute local features of nearby areas are included as well as derivative comparison information to the local features of nearby areas.

Figure 6:
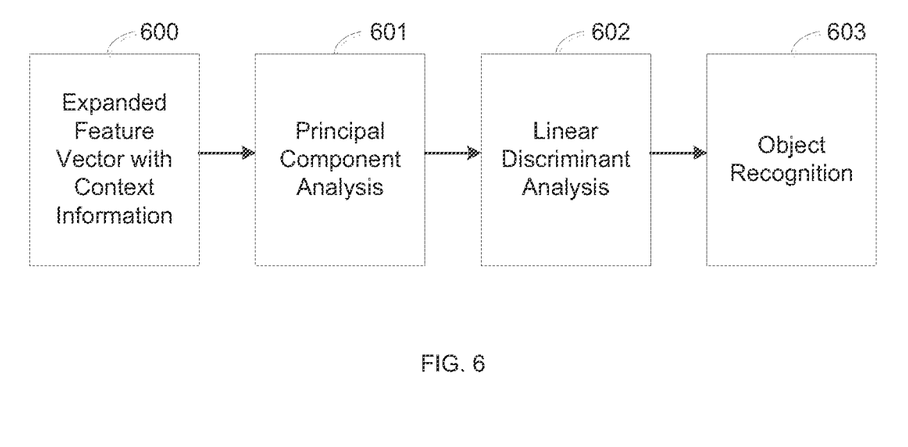
FIG. 6 is a diagram illustrating one example of a flow chart of a method to recognize an object in an image based on a context expanded feature vector.

FIG. 6 is a diagram illustrating one example of a flow chart of a method to recognize an object based on a context expanded feature vector. In some cases additional processing may be performed on an expanded feature vector prior to performing object recognition methods, for example, due to the size and complexity of the expanded feature vector. Starting at 600, a processor creates an expanded feature vector with context information. Methods to reduce the size of the expanded vector may be used to make the larger vector a more manageable size. Moving to 601, the processor may apply principal component analysis (PCA) to the expanded feature vector. PCA may be used to reduce the size of the vector while maintaining the energy. PCA may be useful due to the longer size of the expanded feature vector. Continuing to 602, the processor applies linear discriminant analysis (LDA) to the expanded feature vector. LDA may increase the discriminative power of the expanded feature vector. The processor may apply one of PCA and LDA or both. The processor may evaluate the vector to determine whether to apply PCA and/or LDA. Other dimensionality reduction methods may be applied instead of or in addition to PCA and LDA. Proceeding to 603, the processor performs object recognition methods on the altered expanded feature vector. Including context information on a local level within a feature vector allows for more accurate object recognition.

The invention claimed is:

1. A computing system, comprising:
 a processor to:
  overlay a grid on an image, the grid having a plurality of positions;
  determine a feature vector representing each position of the grid, the feature vector having a plurality of vector positions, each vector position comprising a vector item representing a characteristic of the area of the image covered by the feature vector,
   the feature vector comprising context information at an end thereof, the context information including derivative information of the feature vector, the derivative information including a velocity and an acceleration for each vector item,
   the velocity and the acceleration for each vector item describing a change of the vector item in an area in the image surrounding the position represented by the feature vector, and including derivatives in multiple directions within the area;
  determine the presence of an object in the image based on the feature vector; and
  output information about the determined object.

2. The computing system of claim 1, wherein the processor is further to apply a dimensionality reduction technique to the expanded feature vector.

3. A method, comprising:
 overlaying, by a processor, a grid on an image, the grid having a plurality of positions;
 determining, by the processor, a feature vector representing each position of the grid, the feature vector having a plurality of vector positions, each vector position comprising a vector item representing a characteristic of the area of the image covered by the feature vector,
  the feature vector comprising context information at an end thereof, the context information including derivative information of the feature vector, the derivative information including a velocity and an acceleration for each vector item,
  the velocity and the acceleration for each vector item describing a change of the vector item in an area in the image surrounding the position represented by the feature vector, and including derivatives in multiple directions within the area;
 determining, by the processor, the presence of an object in the image based on the feature vector; and
 outputting, by the processor, information about the determined object.

4. The method of claim 3, further comprising applying a dimensionality reduction method to the feature vector.

5. The method of claim 3, further comprising:
 determining a window surrounding the area;
 concatenating feature vectors for areas within the window to the feature vector.

6. The method of claim 5, wherein the window comprises a circular or rectangular window around the area.

7. A machine-readable non-transitory storage medium comprising instructions executable by a processor to:
 overlay a grid on an image, the grid having a plurality of positions;
 determine a feature vector representing each position of the grid, the feature vector having a plurality of vector positions, each vector position comprising a vector item representing a characteristic of the area of the image covered by the feature vector,
  the feature vector comprising context information at an end thereof, the context information including derivative information of the feature vector, the derivative information including a velocity and an acceleration for each vector item,
  the velocity and the acceleration for each vector item describing a change of the vector item in an area in the image surrounding the position represented by the feature vector, and including derivatives in multiple directions within the area;
 determine the presence of an object in the image based on the feature vector; and
 output information about the determined object.

8. The machine-readable non-transitory storage medium of claim 7, further comprising instructions to apply a dimensionality reduction method to the stacked feature vector.

* * * * *